(12) United States Patent
Kiguchi et al.

(10) Patent No.: US 8,569,390 B2
(45) Date of Patent: Oct. 29, 2013

(54) POLYPROPYLENE RESIN PRE-EXPANDED PARTICLES AND IN-MOLD FOAMED ARTICLES PREPARED THEREFROM

(75) Inventors: Taro Kiguchi, Settsu (JP); Tomonori Iwamoto, Houston, TX (US)

(73) Assignee: Kaneka Corporation, Osaka (JP)

( * ) Notice: Subject to any disclaimer, the term of this patent is extended or adjusted under 35 U.S.C. 154(b) by 410 days.

(21) Appl. No.: 11/795,067

(22) PCT Filed: Dec. 21, 2005

(86) PCT No.: PCT/JP2005/023475
§ 371 (c)(1),
(2), (4) Date: Jul. 11, 2007

(87) PCT Pub. No.: WO2006/075491
PCT Pub. Date: Jul. 20, 2006

(65) Prior Publication Data
US 2008/0153933 A1   Jun. 26, 2008

(30) Foreign Application Priority Data
Jan. 12, 2005  (JP) .................. 2005-004980

(51) Int. Cl.
*C08J 9/16* (2006.01)
*C08J 9/22* (2006.01)
*C08L 23/00* (2006.01)

(52) U.S. Cl.
USPC ............ 521/59; 521/56; 521/80; 525/240

(58) Field of Classification Search
USPC .................. 521/56, 59, 80; 525/240
See application file for complete search history.

(56) References Cited

U.S. PATENT DOCUMENTS

| | | | |
|---|---|---|---|
| 4,186,240 A * | 1/1980 | Matsuda et al. | 428/349 |
| 4,908,393 A | 3/1990 | Arai et al. | |
| 5,032,620 A | 7/1991 | Arai et al. | |
| 5,747,549 A | 5/1998 | Tsurugai et al. | |
| 5,925,686 A | 7/1999 | Kogel et al. | |
| 6,166,096 A | 12/2000 | Ichimura et al. | |
| 6,265,083 B1 * | 7/2001 | Tanizaki et al. | 428/515 |

(Continued)

FOREIGN PATENT DOCUMENTS

| | | |
|---|---|---|
| JP | 1-242638 | 9/1989 |
| JP | 3-152136 | 6/1991 |

(Continued)

OTHER PUBLICATIONS

International Preliminary Report on Patentability.

*Primary Examiner* — David Buttner
*Assistant Examiner* — Kara Boyle
(74) *Attorney, Agent, or Firm* — Hamre, Schumann, Mueller & Larson, P.C.

(57) ABSTRACT

An object of the present invention is to provide an in-mold foamed article having good surface appearances and high rigidity produced by using a common molding machine that withstands a pressure of up to 0.4 MPa. The present invention provides polypropylene resin pre-expanded particles containing a base resin which is a resin having a melt flow rate of 5 g/10 min or more and 20 g/10 min or less and a melting point of 140° C. or higher and 155° C. or lower and satisfying the conditional formula below, and an in-mold foamed article produced from molding the pre-expanded particles:

[Heat of crystal fusion (J/g)]≥1.2×
[Melting point (° C.)]−96.

5 Claims, 2 Drawing Sheets

(56) References Cited

U.S. PATENT DOCUMENTS

| | | | |
|---|---|---|---|
| 6,433,102 | B1 * | 8/2002 | Suzuki et al. ............ 525/333.3 |
| 6,593,382 | B2 * | 7/2003 | Kiguchi et al. ............ 521/58 |
| 2003/0162012 | A1 * | 8/2003 | Sasaki et al. ............ 428/323 |

FOREIGN PATENT DOCUMENTS

| | | |
|---|---|---|
| JP | 3-254930 | 11/1991 |
| JP | 7-258455 | 10/1995 |
| JP | 8-277340 | 10/1996 |
| JP | 10-45938 | 2/1998 |
| JP | 10-306173 | 11/1998 |
| JP | 10-316791 | 12/1998 |
| JP | H 11-505868 | 5/1999 |
| JP | 11-147972 | 6/1999 |
| JP | 11-156879 | 6/1999 |
| JP | 2000-108134 | 4/2000 |
| JP | 2000-327825 | 11/2000 |
| JP | 2004-175819 | 6/2004 |
| JP | 2005-298769 | 10/2005 |

* cited by examiner

POLYPROPYLENE RESIN PRE-EXPANDED PARTICLES AND IN-MOLD FOAMED ARTICLES PREPARED THEREFROM

TECHNICAL FIELD

The present invention relates to polypropylene resin pre-expanded particles usable in automotive interior components, automobile bumper core materials, thermal insulation materials, cushioning packaging materials, returnable boxes, and the like, and to in-mold foamed articles prepared from the pre-expanded particles.

BACKGROUND ART

In-mold foamed articles prepared from polypropylene resin pre-expanded particles have advantages such as the capability to be formed into desired shapes, lightweight, and thermal insulation ability. When compared with articles prepared by using a similar type of pre-expanded particles, the in-mold foamed articles prepared from polypropylene resin pre-expanded particles have chemical resistance, thermal resistance, and distortion restoration rate after compression superior to those of in-mold foamed articles prepared from polystyrene resin pre-expanded particles, and exhibit higher dimensional accuracy, thermal resistance, and compression strength than those of in-mold foamed articles prepared from polyethylene resin pre-expanded particles. The in-mold foamed articles prepared from polypropylene resin pre-expanded particles having these features thus are applied for various uses including automobile interior components, automobile bumper core materials, thermal insulation materials, and cushioning packaging materials.

Molding machines used today for the production of in-mold foamed articles from polypropylene resin pre-expanded particles are mostly of a type that withstands a pressure of 0.4 MPa, and the pressure of the heating steam for molding usually employed for the molding machines is up to about 0.36 MPa. The polypropylene resin pre-expanded particles used for in-mold foaming are composed of a resin having properties that comply with these conditions. Typically, an ethylene-polypropylene random copolymer having a melting point of about 140° C. to 150° C. is used.

The uses of the in-mold foamed articles include many that require high rigidity, such as automobile interior components and automobile bumper core materials. The rigidity of the in-mold foamed articles generally depends on the rigidity of starting material resins and expansion ratios. The in-mold foamed articles applied for such uses currently achieve the required high rigidity by using a product having a high density, i.e., a product foamed at a low expansion ratio. However, the increase in density degrades the lightweight originally expected from the in-mold foamed articles. In particular, this results in a decrease in fuel consumption of automobiles equipped with components composed of such articles and also in an increase in weight of the ultimate waste product. Thus, an increase in density should be avoided where possible. On the other hand, by increasing the rigidity of the resin in itself, which is another possible approach for achieving high rigidity, the manufacturing conditions for in-mold foaming become more stringent, and this increases the cost for the foaming process. In detail, a polypropylene resin having high rigidity usually has a low comonomer content and a high melting point. The pressure of the heating steam for molding required to obtain a satisfactory molded article tends to increase with the increase in melting point of the resin. Thus, in order to achieve higher rigidity, a molding machine and a die that can withstand high pressures must be used, thereby increasing the equipment cost and utility cost. As a result, the cost for the molding process is increased.

In recent years, the importance of the appearance is increasing even for the in-mold foamed articles. The appearance is notably important for uses, such as automobile interior components and returnable boxes, that catch people's eyes. The in-mold foamed articles are required to have good appearance in addition to physical properties, such as rigidity, lightweight, and thermal insulation ability, usually required for the in-mold foamed articles. Owing to their production process, the in-mold foamed articles have inter-particle gaps and honeycomb patterns due to particle shapes in their appearance. Many products that require good appearance cannot accept such appearances. In order to render inter-particle gaps less noticeable, for example, the pressure of heating steam during the in-mold foaming generally is increased to promote the fusion among the particles. In order to remove the honeycomb patterns derived from the particle shape, a technology that uses a die having surface provided with fine irregularities (refer to, for example, Patent Document 1 shown below) has been practiced. According to this technology, the pressure of the heating steam during the in-mold foaming is set to a high level to promote the transfer of the irregularities onto the foamed articles. As apparent from these technologies, the pressure of the heating steam for molding during the in-mold foaming must be increased to a level higher than that required for fusion of the particles in order to obtain good-appearance in-mold foamed articles whose inter-particle gaps are hardly noticeable, i.e., in order to obtain in-mold foamed articles with good surface appearance.

Thus, a technology that stably can produce high-rigidity polypropylene resin in-mold foamed articles with good surface appearance at a low molding processing temperature without using a special molding machine is desired.

Various technologies for improving the rigidity of the in-mold foamed articles are now being investigated. A conceivable approach simply is to use homopolypropylene to obtain a high rigidity with a polypropylene resin. For example, Patent Document 2 shown below discloses a technology related to homopolypropylene resin pre-expanded particles whose tensile modulus is 15,000 to 25,000 kg/cm$^2$ and the heat of the high-temperature-side peak in a differential scanning calorimetry (DSC) curve observed with a differential scanning calorimeter is 30 to 60 J/g. Moreover, Patent Document 3 shown below discloses a technology capable of preparing pre-expanded particles that may produce an in-mold foamed article at a relatively low molding temperature using a homopropylene resin whose melt flow rate (MFR) is 20 to 100 g/10 min.

However, according to the technology disclosed in the Patent Document 2, the pressure of the heating steam during the molding required for obtaining a satisfactory in-mold foamed article is described as being in the range of 0.4 to 0.6 MPa. Thus, a molding machine that withstands a pressure of only up to 0.4 MPa may not be used for molding. Moreover, the surface appearance of the resulting article is not particularly described. According to the technology disclosed in the Patent Document 3, although homopolypropylene and a random polypropylene resin with a low comonomer content are used, no specific description is provided regarding the surface appearance. This technology also sets a similar evaluation standard, i.e., whether the fusion between the expanded particles is observed at a ratio of 60% or more. However, this standard is for evaluating whether local fusion between particles inside the in-mold foamed article occurs or not. Unlike the standard for obtaining surface appearance, such a standard is satisfied easily by use of low molding heating steam pressure. It is presumably difficult practically to obtain a molded article with good surface appearance using a molding machine that withstands a pressure of up to 0.4 MPa according to the technology disclosed in this related art document.

A technology that uses polypropylene random copolymers is also being investigated from the standpoint of high moldability, although the rigidity of the resulting article is not as high as that achieved by homopolypropylene. For example, Patent Document 4 shown below discloses a technology for obtaining a foamed article having a high compression strength and moldability by using a resin whose ratio of the weight-average molecular weight Mw to the number-average molecular weight Mn is 6 or less and whose ratio l/lo of the diameter l of the resin discharged from an orifice to the diameter lo of the orifice is 1.15 or less when the MFR is measured with a MFR meter according to Japanese Industrial Standard (JIS) K-7210. However, this technology is merely a technique for realizing the production of a satisfactory in-mold foamed article without impregnating pre-expanded particles with inorganic gas or without filling a die with pre-expanded particles in the compressed state in the course of in-mold foaming. The effect of enhancing the compression strength of the in-mold foamed article rarely is exhibited according to this technology. In fact, the compression strength of the foamed article described in this document is at most 2.9 kgf/cm$^2$ at a molding heating pressure of 3.0 kgf/cm$^2$. Such a compression strength is not significantly different from that of polypropylene resin foamed articles commonly used today. According to this technology, a polypropylene resin foamed article having a compression strength of 3.3 kgf/cm$^2$ barely is obtained at a high molding heating pressure of 3.5 kgf/cm$^2$. Furthermore, although the inter-particle gaps of the molded articles are evaluated, it is not likely that the good surface appearance is realized with this technology.

Moreover, Patent Document 5 shown below discloses a technology that uses resin particles having a melting point of 155° C. to 165° C., a ratio Mz/Mw of the Z-average molecular weight to the weight-average molecular weight of 3 to 6, and a MFR of 10 to 150 g/L. The main objective of this technology is to obtain expanded particles for in-mold foaming without using a so-called "DOKAN" method. Moreover, as evident from the fact that the melting point of the resin exceeds 155° C., the heating condition for obtaining a foamed article is as high as a level exceeding 4 kgf/cm$^2$.

Patent Document 6 shown below discloses a technology that uses a base resin composed of a propylene random copolymer having a melting point of 149° C. to 157° C., a MFR of 1 to 20 g/10 min, and a half crystallization time not exceeding a certain value.

Moreover, Patent Document 7 shown below discloses a technology for increasing the compression strength of an in-mold foamed article obtained by setting the relationship between the amount of crystals at the high-temperature-side of a crystal fusion curve and that at the low-temperature-side within a particular range. Here, the crystal fusion curve is obtained by the observation of the crystals of polypropylene resin pre-expanded particles for in-mold foaming by differential scanning calorimetry (referred to as "DSC" hereinafter).

However, these technologies require heating steam having a pressure as high as 0.4 to 0.5 MPa for in-mold foaming and are practicable only by using a highly pressure resistant molding machine, as with the technologies described in the above mentioned Patent Document 2 and 3.

Furthermore, Patent Document 8 shown below discloses a technology for obtaining a resin having a high tensile modulus for the resin melting point, i.e., a high rigidity, by using a polypropylene resin containing 1-butene as a comonomer and for obtaining a high-rigidity in-mold foamed article from this resin.

This technology also requires heating steam having a pressure of about 0.4 MPa for in-mold foaming. Although the pressure of the molding heating steam is relatively low compared to other technologies, the lowest pressure in the practical examples is 0.36 MPa, which is very close to the upper limit of the pressure, 0.4 MPa, employed in common molding machines. Moreover, no specific description is provided for surface appearance. It is considered that a higher molding heating steam pressure is necessary to obtain a good surface appearance.

Furthermore, Patent Document 9 shown below discloses a technology for obtaining a high-rigidity polypropylene resin foamed article by using polypropylene resin pre-expanded particles whose base resin is a propylene/1-butene random copolymer containing 3 to 12 percent by weight of 1-butene. According to the description, this technology permits using a common molding machine that withstands a pressure of up to 0.4 MPa since the pressure of the molding heating steam is about 0.3 MPa. According to an example described in this document, however, the rigidity of the in-mold foamed article obtained by a molding heating steam pressure of or near 0.3 MPa is 6.2 kg/cm$^2$ of compressive strength measured according to Japanese Industrial Standard (JIS) K-6767 under a 50% compression strain at 20° C. This level of rigidity is not enough for uses that require high rigidity. Moreover, 1-butene single-system polypropylene resin random copolymer containing no ethylene component is hard and brittle compared to ethylene-containing polypropylene resin random copolymers. Thus, when it is used as the base resin of the foamed article, the foamed article will have poor dimensional recovery ability after compression and low impact properties in a low-temperature region. Polypropylene resin foamed articles have lower rigidity but superior resistance to repeated impacts and flexibility when compared with polystyrene resin in-mold foamed articles. For these properties, the polypropylene resin also is used for cushioning packaging materials. Accordingly, the technology described in this document has a drawback in that the technology is not suitable for typical cushioning packaging uses other than those that require only high rigidity.

As discussed above, a special molding machine that can withstand high molding heating steam pressure has been used for applications that require high rigidity. However, in order to increase the pressure resistance of the molding machine, the size of the machine must be increased to increase the strength of the molding machine. Moreover, the thickness of a die also must be increased. These factors substantially increase the equipment cost, which is problem.

Furthermore, increasing the pressure of the molding heating steam leads to an increase in the amount of steam required for heating during molding. Thus, the amount of cooling water must be increased, thereby also increasing the energy cost. Since the heating to a higher temperature is required, the heating for molding takes a longer time, and the process of cooling the heated die with cooing water also takes a longer time. Thus, the production cycle per product takes a longer time, thereby leading to a decreased production efficiency. Moreover, since the shape of the die for in-mold foaming is complicated, local concentration of stress may occur on the die during the molding and heating depending on the shape, which may lead to breaking of the die and a further increase in cost.

As is described above, increasing the molding heating steam pressure during the in-mold foaming generates various problems. The pressure of the molding heating steam is preferably as low as possible. According to the existing technologies, it is difficult to obtain high-rigidity polypropylene resin pre-expanded particles for in-mold foaming that stably can produce molded articles using a common molding machine that withstands a pressure of up to 0.4 MPa. Moreover, no technology that achieves the required surface appearance for the in-mold foamed articles has been available so far.

On the other hand, a technology for imparting a new property to a resin by incorporating a resin having a different physical property has been developed. Patent Document 10 shown below discloses polypropylene resin pre-expanded particles composed of a mixed resin containing 90 to 10 percent by weight of a polypropylene resin having a MFR of 6 to 10 g/10 min and 10 to 90 percent by weight of a polypropylene resin having a MFR of 0.5 to 3 g/10 min, the mixed resin having a MFR of 2 to 5 g/10 min. The document describes that a molded article having good surface quality and fusibility and free of sink marks(deformation) can be obtained in a short molding time by using these pre-expanded particles. This document primarily describes effects related to the molding time and does not particularly refer to the rigidity. Moreover, although the skin mark of the molded article is evaluated, no specific description on surface appearance is provided.

Patent Document 1: Japanese Unexamined Patent Application Publication No. 2000-108134.

Patent Document 2: Japanese Unexamined Patent Application Publication No. 8-277340.

Patent Document 3: Japanese Unexamined Patent Application Publication No. 10-45938

Patent Document 4: Japanese Unexamined Patent Application Publication No. 3-152136.

Patent Document 5: Japanese Unexamined Patent Application Publication No. 10-306173.

Patent Document 6: Japanese Unexamined Patent Application Publication No. 10-316791.

Patent Document 7: Japanese Unexamined Patent Application Publication No. 11-156879.

Patent Document 8: Japanese Unexamined Patent Application Publication No. 7-258455.

Patent Document 9: Japanese Unexamined Patent Application Publication No. 1-242638.

Patent Document 10: Japanese Unexamined Patent Application Publication No. 2000-327825.

DISCLOSURE OF INVENTION

Problems to be Solved by the Invention

As to the production of in-mold foamed articles from polypropylene resin pre-expanded particles, an object of the present invention is to develop polypropylene resin pre-expanded particles that stably can produce a high-rigidity in-mold foamed article with good surface appearance with a common molding machine that can withstand a pressure of up to 0.4 MPa.

Means to Solve the Problems

Intensive studies have been carried out to achieve the above-described object. It has been found that an in-mold foamed article having high rigidity and a good surface appearance can be obtained at a low molding processing temperature by using polypropylene resin pre-expanded particles whose base resin is a polypropylene resin which has a MFR of 5 g/10 min or more and 20 g/10 min or less and a melting point of 140° C. or higher and 155° C. or lower, which exhibits a heat of crystal fusion and the resin melting point (both determined with a differential scanning calorimeter) satisfying a particular relationship, and which has a molecular weight distribution, Mw/Mn, of 6 or less, or a resin mixture containing such a specified propylene resin. Based on the finding, the present invention has been achieved.

A first aspect of the present invention provides a polypropylene resin pre-expanded particle containing a base resin including a polypropylene resin that has a MFR of 5 g/10 min or more and 20 g/10 min or less, a melting point of 140° C. or higher and 155° C. or lower, and a molecular weight distribution Mw/Mn of 6 or less, and that exhibits a relationship between a heat of crystal fusion and the resin melting point determined with a differential scanning calorimeter satisfying conditional formula (1):

$$[\text{Heat of crystal fusion (J/g)}] \geq 1.2 \times [\text{Melting point (° C.)}] - 96 \qquad (1)$$

A second aspect of the present invention provides a polypropylene resin pre-expanded particle comprising a base resin, a polypropylene resin that has a MFR of 5 g/10 min or more and 20 g/10 min or less and a melting point of 140° C. or higher and 155° C. or lower, the base resin containing 70 percent or more and 95 percent or less by weight of a polypropylene resin (A) having a MFR of 10 g/10 min or more and 30 g/10 min or less and a molecular weight distribution Mw/Mn of 6 or less and 5 percent or more and 30 percent or less by weight of a polypropylene resin (B) having a MFR of 0.1 g/10 min or more and 3 g/10 min or less, the polypropylene resin exhibiting a relationship between a heat of crystal fusion and the resin melting point determined with a differential scanning calorimeter satisfying conditional formula (1):

$$[\text{Heat of crystal fusion (J/g)}] \geq 1.2 \times [\text{Melting point (° C.)}] - 96 \qquad (1)$$

According to a preferred embodiment, the present invention provides the above-described polypropylene resin pre-expanded particle in which the polypropylene resin used as the base resin contains 1-butene as a comonomer, and that more preferably, with respect to the polypropylene resin pre-expanded particle, a ratio of heat at the high-temperature-side fusion peak calculated from heat Ql at a low-temperature side fusion peak and heat Qh at a high-temperature-side fusion peak, i.e., $\{Qh/(Ql+Qh)\} \times 100$, is 15% or more and 50% or less, the two fusion peaks being observed by differential scanning calorimetry.

A third aspect of the present invention provides an in-mold foamed article produced from the above-described polypropylene resin pre-expanded particle, the article having a density of 10 kg/m³ or more and 300 kg/m³ or less.

Effects of the Invention

According to the present invention, a polypropylene resin in-mold foamed article having high rigidity and a good surface appearance stably can be produced at a low molding temperature without requiring a special molding machine.

BEST MODE FOR CARRYING OUT THE INVENTION

Figure 1:
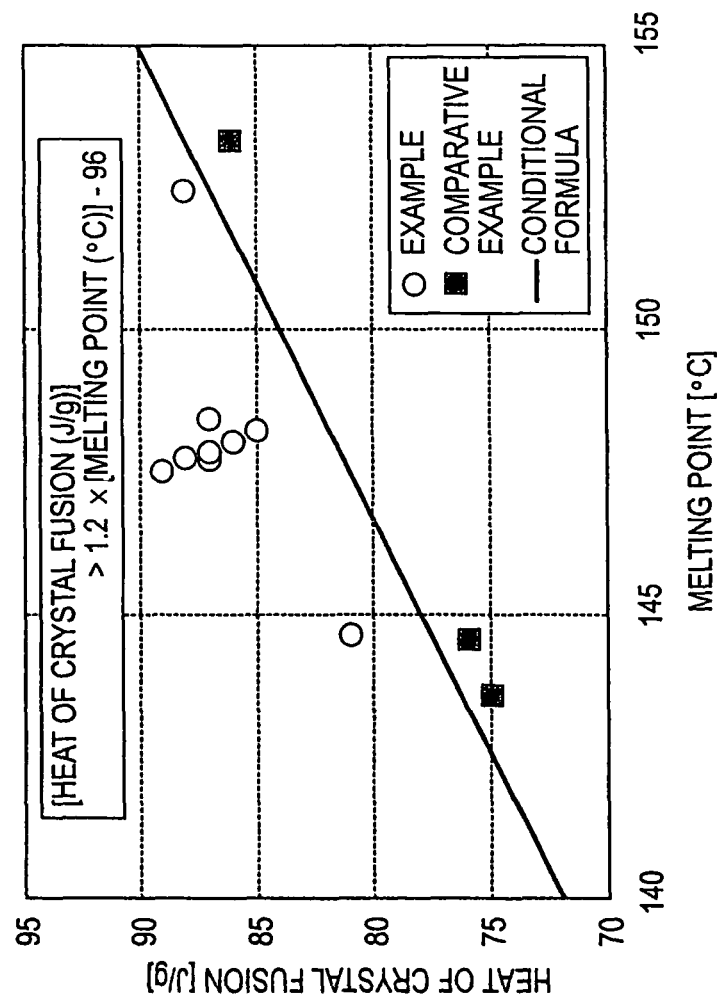
FIG. 1 is a graph showing the resin melting point in the abscissa and the heat of crystal fusion in the ordinate for EXAMPLES and COMPARATIVE EXAMPLES analyzed, in which the region above the straight line is a region of the melting point of the base resin and the heat of crystal fusion according to the present invention.

The pre-expanded particles of the present invention include a base resin that is a polypropylene resin having a MFR of 5 g/10 min or more and 20 g/10 min or less and a melting point of 140° C. or higher and 155° C. or lower, the molecular weight distribution Mw/Mn of 6 or less, and which exhibits a heat of crystal fusion and the resin melting point satisfying conditional formula (1) as determined with a differential scanning calorimeter:

$$[\text{Heat of crystal fusion (J/g)}] \geq 1.2 \times [\text{Melting point (°C.)}] - 96 \quad (1)$$

The MFR of the base resin is 5 g/10 min or more and 20 g/10 min or less and preferably 7 g/10 min or more and 15 g/10 min or less. At an MFR within this range, a good balance between the molding temperature and the molding time during the in-mold foaming can be achieved.

The melting point of the base resin is 140° C. or higher and 155° C. or lower and preferably 145° C. or higher and 152° C. or lower. At a melting point within this range, an in-mold foamed article having a high compression strength and good surface appearance can be produced with a common molding machine that can withstand a pressure of up to 0.4 MPa.

Furthermore, when the molecular weight distribution Mw/Mn is 6 or less, the molecular weights of the polypropylene molecules in the base resin are relatively uniform, and this promotes crystallization of polypropylene resin, which is a crystalline resin. As a result, a polypropylene resin having a high crystal content can be obtained.

The base resin of the pre-expanded particles satisfies the following relationship (1) between the heat of crystal fusion and the resin melting point:

$$[\text{Heat of crystal fusion (J/g)}] \geq 1.2 \times \text{Melting point (°C.)}] - 96 \quad (1)$$

When the base resin satisfies the above-described range of the MFR and the molecular weight distribution, polypropylene molecules having relatively low molecular weights are present in a state such that they have substantially uniform molecular weights, and the crystallization of a resin formed with such polypropylene molecules is promoted further. Therefore, the resin thus formed has a larger amount of crystals than a usual polypropylene resin having the same melting point. The conditional formula (1) indicates that the resin contains a large amount of crystals. Such a resin is expected to have an enhanced strength due to its high crystallinity, and an in-mold foamed article prepared from the resin will exhibit a higher compression strength.

According to a first preferred embodiment of the present invention, the base resin is a polypropylene resin that has a MFR of 5 g/10 min or more and 20 g/10 min or less and a melting point of 140° C. or higher and 155° C. or lower, exhibits a heat of crystal fusion and the resin melting point (both determined with a differential scanning calorimeter) satisfying conditional formula (1) described above, and has a molecular weight distribution Mw/Mn of 6 or less. At a molecular weight distribution of 6 or less, the molecular weights of the polypropylene molecules in the base resin are relatively uniform, and this promotes crystallization of polypropylene resin, which is a crystalline resin. As a result, a polypropylene resin having a high crystal content can be obtained.

According to a second preferred embodiment of the present invention, the base resin is a polypropylene resin that has a MFR of 5 g/10 min or more and 20 g/10 min or less and preferably 7 g/10 min or more and 15 g/10 min or less, and a melting point of 140° C. or higher and 155° C. or lower and preferably 145° C. or higher and 152° C. or lower, and exhibits a heat of crystal fusion and the resin melting point (both determined with a differential scanning calorimeter) satisfying conditional formula (1) described above, the base resin containing 70 percent or more and 95 percent or less by weight of a polypropylene resin (A) having a MFR of 10 g/10 min or more and 30 g/10 min or less and a molecular weight distribution Mw/Mn of 6 or less and 5 percent or more and 30 percent or less by weight of a polypropylene resin (B) having a MFR of 0.1 g/10 minor more and 3 g/10 minor less. The polypropylene resin (A) having a MFR of 10 g/10 min or more and 30 g/10 min or less and a molecular weight distribution Mw/Mn of 6 or less preferably has a melt flow rate (MFR) of 10 g/10 min or more and 20 g/10 min or less and has a molecular weight distribution Mw/Mn of 6 or less. When the MFR and the molecular weight distribution are both within these ranges, polypropylene molecules having relatively low molecular weights are present in a state such that they have substantially uniform molecular weights, and the crystallization of a resin formed with such polypropylene molecules is promoted further. Therefore, the resin thus formed has a larger amount of crystals than a usual polypropylene resin having the same melting point.

The polypropylene resin (B) having a MFR of 0.1 g/10 min or more and 3 g/10 min or less of the present invention preferably has a MFR of 0.3 g/10 min or more and 2 g/10 min or less. A polypropylene resin having a MFR within this range can achieve high production efficiency during the in-mold foaming and can produce a polypropylene resin foamed article having a good surface appearance.

The polypropylene resin pre-expanded particles of the second embodiment use as the base resin a mixed resin containing 70 percent or more and 95 percent or less by weight of the polypropylene resin (A) and 5 percent or more and 30 percent or less by weight of the polypropylene resin (B). The incorporation of 70 percent or more and 95 percent or less by weight of the polypropylene resin (A) tends to increase the rigidity of the in-mold foamed article obtained from the polypropylene resin pre-expanded particles containing such a resin as the base resin.

The polypropylene resin used in the present invention is a resin whose main component monomer is propylene. Examples of the comonomer include α-olefins having 2 or 4 to 12 carbon atoms, such as ethylene, 1-butene, isobutene, 1-pentene, 3-methyl-1-butene, 1-hexene, 4-methyl-1-pentene, 3,4-dimethyl-1-butene, 1-heptene, 3-methyl-1-hexene, 1-octene, and 1-decene; cyclic olefins such as cyclopentene, norbornene, and tetracyclo[6.2.1$^{1,8}$.1$^{3,6}$]-4-dodecene; dienes, such as 5-methylene-2-norbornene, 5-ethylidene-2-norbornene, 1,4-hexadiene, methyl-1,4-hexadiene, and 7-methyl-1,6-octadiene; and vinyl monomers such as vinyl chloride, vinylidene chloride, acrylonitrile, vinyl acetate, acrylic acid, methacrylic acid, maleic acid, ethyl acrylate, butyl acrylate, methyl methacrylate, maleic anhydride, styrene, methylstyrene, vinyltoluene, and divinyl benzene. Of these, ethylene and 1-butene are preferably used because of their advantages such as the resistance to cold brittleness and the inexpensiveness.

The base resin of the polypropylene resin pre-expanded particles of the present invention preferably contains 1-butene as a comonomer. The incorporation of the 1-butene comonomer tends easily to produce a polypropylene resin in-mold foamed article having a high crystallinity for the resin melting point and a high rigidity.

These polypropylene resins are preferably non-crosslinked but may be crosslinked by a peroxide or radiation. Another thermoplastic resin, such as a low-density polyethylene, a linear low-density polyethylene, a polystyrene, a polybutene, or an ionomer, miscible with the polypropylene resin can be used within a range that does not impair the characteristics of the polypropylene resin.

The polypropylene pre-expanded particles of the present invention have two fusion peaks in the measurement by differential scanning calorimetry (DSC). The ratio of heat at the high-temperature-side fusion peak calculated from heat Ql at a low-temperature side fusion peak and heat Qh at a high-temperature-side fusion peak, i.e., $\{Qh/(Ql+Qh)\} \times 100$ (hereinafter this ratio is referred to as "DSC ratio"), is preferably 15% or more and 50% or less, and more preferably 18% or more and 40% or less. At a DSC ratio within this range, an in-mold foamed article with good surface appearance tends to be obtained easily.

Typically, the polypropylene resin described above is melted preliminarily using an extruder, a kneader, a banbury mixer, a roller, or the like and formed into polypropylene resin particles of a desired shape, such as a cylindrical, elliptic, spherical, cubic, or rectangular parallelopiped shape, with an average particle diameter of 0.1 to 5 mm and preferably 0.5 to 3 mm so that the (poly)propylene-based resin easily can be subjected to pre-expansion. A component, such as an antistatic agent, a pigment, a flame retardancy improver, or a conductivity improver, that is added as required preferably is blended into molten resin during the process of producing resin particles.

The polypropylene resin pre-expanded particles of the present invention are produced by, for example, impregnating polypropylene resin particles with a foaming agent in a pressure vessel, dispersing the resulting particles in water by stirring, heating the resulting aqueous dispersion to a particular foaming temperature under pressure, and releasing the aqueous dispersion into a low-pressure zone.

The foaming temperature is selected based on the type of the polypropylene resin, the amount of the foaming agent used, the target expansion ratio of the pre-expanded particles, and the like. The foaming temperature is preferably in the range from a temperature of 20° C. lower than the melting point of the polypropylene resin to a temperature of 10° C. higher than the melting point of the polypropylene resin.

Examples of the foaming agent impregnated in the polypropylene resin particles of the present invention include aliphatic hydrocarbons such as propane, butane, pentane, and hexane; alicyclic hydrocarbons such as cyclopentane and cyclobutane; and inorganic gasses such as air, nitrogen gas, and carbon dioxide gas; and water etc. These foaming agents may be used alone or in combination of two or more of these. The amount of the foaming agent used is not particularly limited and may be appropriately selected according to the desired expansion ratio of the polypropylene resin pre-expanded particles. The amount of the foaming agent is usually 5 parts or more and 60 parts or less by weight per 100 parts by weight of the polypropylene resin particles. Preferable examples of the foaming agent are water and butane, which enable foaming at a high expansion ratio.

In preparing the aqueous dispersion described above, a dispersant, such as calcium tertiary phosphate, basic magnesium carbonate, or calcium carbonate, is used, or a small amount of surfactant, e.g., sodium dodecylbenzenesulfonate, sodium n-paraffin sulfonate, or sodium a-olefin sulfonate, as a dispersion auxiliary agent is used in combination.

Though the amounts of the dispersant and the surfactant vary depending on the type of the dispersant and the surfactant and the type and amount of the polypropylene resin particles, a dispersant usually is used in an amount of 0.2 parts or more and 3 parts or less by weight and a surfactant is usually used in an amount of 0.001 parts or more and 0.2 parts or less by weight per 100 parts by weight of water.

In order to enhance the dispersibility of the polypropylene resin particles containing the foaming agent in water, 20 parts or more and 100 parts or less by weight of the polypropylene resin particles containing the foaming agent preferably is added to 100 parts by weight of water.

The resulting aqueous dispersion is heated under pressure and released into a low-pressure zone through an orifice with an opening diameter of 2 to 10 mm to pre-expand the polypropylene resin particles. As a result, the polypropylene resin pre-expanded particles of the present invention are obtained.

The pressure vessel is not particularly limited and any one that can withstand the above-described pressure and temperature may be used. An example of the pressure vessel is an autoclave pressure vessel.

A known method may be used for in-mold foaming of the polypropylene resin pre-expanded particles of the present invention. Examples thereof include (1) a method that directly uses the pre-expanded particles; (2) a method that imparts foaming ability by injecting inorganic gas, such as air, into the pre-expanded articles in advance; and (3) a method that fills a mold with pre-expanded particles in a compressed state.

One example of the method for forming an in-mold foamed article from the propylene resin pre-expanded particles of the present invention includes air-compressing the pre-expanded particles in a pressure vessel in advance to inject air into the particles to thereby impart the foaming ability, filling a mold that can enclose but cannot hermetically seal its interior with the pre-expanded particles, molding the particles with a heating medium such as steam at a heating steam pressure of about 0.20 to 0.4 MPa in 3 to 30 seconds of heating time to cause fusion between the polypropylene resin pre-expanded particles, cooling the mold with water to a level that can suppress deformation of the in-mold foamed article after the in-mold foamed article is taken out from the mold, and opening the mold to obtain the in-mold foamed article.

In view of the above, the density of the in-mold foamed article prepared from the pre-expanded particles of the present invention is preferably 10 $kg/m^3$ or more and 300 $kg/m^3$ or less, and more preferably 15 $kg/m^3$ or more and 250 $kg/m^3$ or less.

The methods for determining the heat of crystal fusion, resin melting point, MFR, molecular weight distribution Mw/Mn, and DSC ratio now will be described.

The heat of crystal fusion and the resin melting point are determined from a DSC curve obtained using a differential scanning calorimeter, DSC6200 produced by Seiko Instruments Inc., by heating 5 to 6 mg of polypropylene resin particles at a rate of 10° C./min from 40° C. to 220° C. to fuse the resin particles, subsequently cooling the resin particles from 220° C. to 40° C. at a rate of 10° C./min to allow crystallization, and then heating the polypropylene resin particles at a rate of 10° C./min from 40° C. to 220° C. The heat of crystal fusion is the heat corresponding to the region defined by the DSC curve and a base line, which is plotted from the beginning to the end of the fusion in the course of the second heating. The resin melting point is a peak temperature in the DSC curve.

The MFR is measured with a MFR meter described in JIS-K7210, with an orifice diameter of 2.0959±0.005 mm, an orifice length of 8.000±0.025 mm, a load of 2,160 g, and a temperature of 230° C.±0.2° C.

The molecular weight distribution Mw/Mn is calculated from the weight-average molecular weight Mw and the number-average molecular weight Mn measured by size-exclusion gel permeation chromatography.

Figure 2:
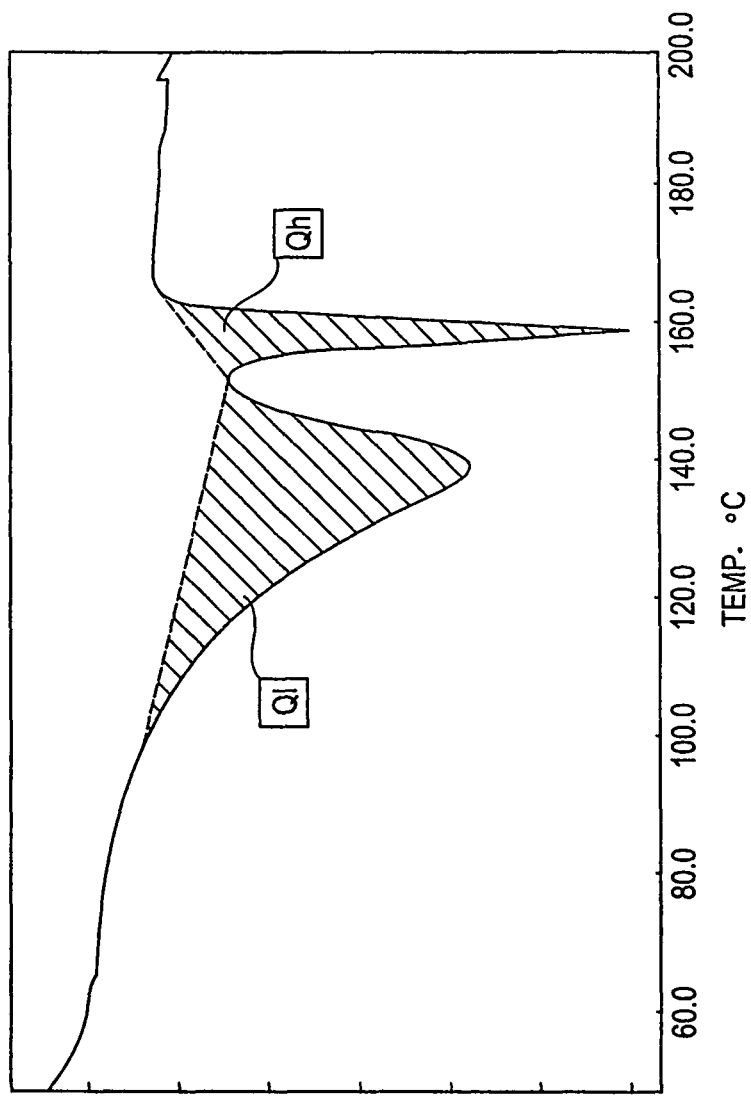
FIG. 2 shows an example of a DSC curve obtained by the analysis of polypropylene resin pre-expanded particles of the present invention using a differential scanning calorimeter, in which the abscissa indicates the temperature and the ordinate indicates the endotherm and in which a shaded region at the low-temperature-side is Ql and a shaded region at the high-temperature-side is Qh.

The DSC ratio is a parameter expressed by the ratio of heat at the high-temperature-side fusion peak, i.e., {Qh/(Ql+Qh)}×100, and is calculated from the two peaks, i.e., the peak heat Ql at the low-temperature-side and the peak heat Qh at the high-temperature-side. The two peaks are observed in a fusion curve (an example of which is shown in FIG. 2) obtained in the course of heating 5 to 6 mg of the polypropylene resin pre-expanded particles from 40° C. to 220° C. at a rate of 10° C./min using a differential scanning calorimeter, DSC6200 produced by Seiko Instruments Inc.

EXAMPLES

The present invention now will be described by way of EXAMPLES and COMPARATIVE EXAMPLES. It should be understood here that the present invention is not limited to these examples. Unless otherwise noted, "part" and "%" are on a weight basis.

The evaluation of EXAMPLES and COMPARATIVE EXAMPLES were conducted as follows.
<Expansion Ratio of Pre-Expanded Particles>

The ethanol-submerged volume v (cm$^3$) and the weight w (g) of the polypropylene resin pre-expanded particles having a bulk volume of about 50 cm$^3$ are determined, and the expansion ratio is determined from the density d (g/cm$^3$) of the resin particles before expansion by the following equation:

Expansion ratio=$d \times v/w$

<Minimum Molding Heating steam Pressure>

Using a polyolefin expansion molding machine, "PearlStar P-150N" produced by Toyo Machinery & Metal Co., Ltd., a block die having dimensions of 270 mm (length)×290 mm (width)×40 mm (thickness) is filled with polypropylene resin pre-expanded particle whose air pressure inside the particles is adjusted preliminarily to 2.0 atm. Air inside the die is removed by steam of 0.1 MPa, and heat molding is performed at a heating steam of a desired pressure for 10 seconds to obtain a molded polypropylene resin foamed article. The surface of the foamed article is observed. Of the pressures of the heating steam that can produce an article having a surface free of irregularities and inter-particle gaps not easily noticeable, the smallest pressure is defined as the minimum molding heating steam pressure. This pressure is the lowest pressure that can impart satisfactory surface appearance, and is an indicator of the surface appearance and the moldability.

<Compression Strength>

A test piece having dimensions of 50 mm (length)×50 mm (width)×and 25 mm (thickness) is cut out from the molded foamed article, and the compression stress at 50% compression when the test piece is compressed at a rate of 10 mm/min according to NDZ-Z0504 is defined as the compression strength. This is an indicator of the rigidity of the in-mold foamed article.

Examples 1 to 7 and 9 to 11 and Comparative Examples 1, 2, 5, and 6

A polypropylene resin having a MFR and a melting point shown in Table 1 was used. To 100 parts of the resin having a composition described in Table 2, 0.01 parts of talc serving as a nucleating agent was added and mixed. The resulting mixture was kneaded in a single-screw extruder (with an aperture diameter of 50 mm) and granulated to produce polypropylene resin particles (1.8 mg per particle).

TABLE 1

| | No. | Type of resin | MFR | Melting point | Mw/Mn |
|---|---|---|---|---|---|
| Component A | A1 | Ethylene-butene-propylene random terpolymer | 14.9 | 147.5 | 5.1 |
| | A2 | Ethylene-butene-propylene random terpolymer | 13.3 | 146.1 | 4.9 |
| | A3 | Ethylene-butene-propylene random terpolymer | 15.0 | 148.0 | 5.8 |
| | A4 | Ethylene-butene-propylene random terpolymer | 13.0 | 143.2 | 5.9 |
| | A5 | Ethylene-butene-propylene random terpolymer | 25.5 | 149.2 | 5.8 |
| | A6 | Ethylene-butene-propylene random terpolymer | 7.0 | 145.0 | 5.7 |
| | A7 | Ethylene-propylene random copolymer | 9.5 | 153.3 | 7.0 |
| | A8 | Homopolypropylene | 20.0 | 167.8 | 8.9 |
| Component B | B1 | Ethylene-propylene random copolymer | 0.5 | 147.5 | — |
| | B2 | Ethylene-propylene random copolymer | 1.0 | 149.0 | — |
| | B3 | Ethylene-propylene random copolymer | 1.3 | 158.0 | — |
| | B4 | Ethylene-propylene random copolymer | 1.0 | 141.0 | — |

A 10 L pressure vessel was charged with 100 parts of the resin particles, 300 parts of an aqueous dispersion medium containing 2 parts of powdery basic calcium tertiary phosphate serving as a dispersant and 0.05 part of sodium n-paraffin sulfonate serving as a dispersion auxiliary agent, and 8 to 16 parts of isobutane serving as an foaming agent. The mixture was heated up to a temperature described in Table 2 while stirring, maintained at that temperature for 10 minutes, and combined with isobutane additionally injected to adjust the pressure to the level shown in Table 2. The pressure was maintained for 30 minutes. Subsequently, while maintaining the vessel inner temperature and pressure to constant levels by injection of isobutane, a valve at the bottom of the pressure vessel was opened to release the aqueous dispersion medium to an atmospheric pressure zone through an orifice plate having an aperture diameter of 4.0 mm to obtain polypropylene resin pre-expanded particles. The obtained expanded par ticles were processed into a molded article, and the minimum molding heating steam pressure thereof was examined. The obtained article was dried at 75° C. for 16 hours, aged for 24 hours at 23° C., and subjected to compression strength measurement. The expansion ratio of the resulting particles, the density of the molded article, the minimum molding heating steam pressure, and the compression strength are shown in Table 3.

Example 8 and Comparative Examples 3 and 4

A resin having a MFR and a melting point shown in Table 1 was used. To 100 parts of the resin having the component ratio described in Table 2, 0.10 part of talc serving as a nucleating agent was added and mixed. The resulting mixture was kneaded in a single-screw extruder (with an aperture diameter of 50 mm) and granulated to produce (poly)propylene resin particles (3.6 mg per particle).

A 10 L pressure vessel was charged with 100 parts of the resin particles and 300 parts of an aqueous dispersion medium containing 2 parts of powdery basic calcium tertiary phosphate serving as a dispersant and 0.05 part of sodium n-paraffin sulfonate serving as a dispersion auxiliary agent. The resulting mixture was heated to a temperature described in Table 2 while stirring and maintained thereat for 10 minutes. While additionally injecting air, the pressure was adjusted to a level described in Table 2 and maintained for 30 minutes. Subsequently, while maintaining the vessel inner temperature and pressure at constant levels by injecting air, a valve at the bottom of the pressure vessel was opened to release the aqueous dispersion medium into an atmospheric pressure zone from an orifice plate having an aperture diameter of 4.0 mm to produce polypropylene resin pre-expanded particles. A molded article was prepared from these expanded particles to examine the minimum molding heating steam pressure. The obtained article was dried at 75° C. for 16 hours, aged for 24 hours at 23° C., and subjected to compression strength measurement. The expansion ratio of the resulting particles, the density of the molded article, the minimum molding heating steam pressure, and the compression strength are shown in Table 3.

TABLE 2

| | Component A | | Component B | | Type of resin | | | | Expansion conditions | |
|---|---|---|---|---|---|---|---|---|---|---|
| | | | | | MFR | Melting point | Heat of fusion | Conditional | Expansion temperature | Expansion pressure |
| | Type | wt % | Type | wt % | [g/10 min] | [° C.] | [J/g] | formula[1] | [° C.] | [MPa] |
| EX. 1 | A1 | 80 | B1 | 20 | 6.6 | 147.7 | 87 | P | 146.0 | 1.65 |
| EX. 2 | A1 | 90 | B1 | 10 | 9.9 | 147.7 | 88 | P | 145.3 | 1.60 |
| EX. 3 | A1 | 80 | B2 | 20 | 8.4 | 148.0 | 86 | P | 145.8 | 1.65 |
| EX. 4 | A1 | 90 | B2 | 10 | 11.2 | 147.8 | 87 | P | 146.5 | 1.63 |
| EX. 5 | A2 | 90 | B2 | 10 | 11.9 | 148.2 | 85 | P | 144.3 | 1.55 |
| EX. 6 | A3 | 90 | B1 | 10 | 10.7 | 148.4 | 87 | P | 146.0 | 1.56 |
| EX. 7 | | | | | | | | | 142.5 | 1.94 |
| EX. 8 | | | | | | | | | 155.8 | 1.70 |
| EX. 9 | A4 | 90 | B2 | 10 | 10.8 | 144.6 | 81 | P | 142.5 | 1.58 |
| EX. 10 | A5 | 80 | B3 | 20 | 12.3 | 152.4 | 88 | P | 152.0 | 1.60 |
| EX. 11 | A1 | 100 | — | — | 14.9 | 147.5 | 89 | P | 147.0 | 1.50 |
| COMP. EX. 1 | A6 | 80 | B4 | 20 | 4.5 | 143.5 | 75 | F | 144.5 | 1.50 |
| COMP. EX. 2 | | | | | | | | | 143.0 | 1.80 |
| COMP. EX. 3 | A6 | 100 | — | — | 7.0 | 144.5 | 76 | F | 152.0 | 3.00 |
| COMP. EX. 4 | | | | | | | | | 153.0 | 1.80 |
| COMP. EX. 5 | A7 | 100 | — | — | 9.5 | 153.3 | 86 | F | 153.5 | 1.65 |
| COMP. EX. 6 | A8 | 100 | — | — | 20 | 167.8 | 106 | F | 167.0 | 1.70 |

[1]P indicates that the example satisfied the conditional formula. F indicates that the example did not satisfy the conditional formula.

TABLE 3

| | Particle properties | | | Molded article properties | | |
|---|---|---|---|---|---|---|
| | DSC ratio [%] | Foaming agent | Expansion ratio [times] | Minimum molding heating steam pressure [MPa] | Density of molded article [kg/m³] | Compression strength [MPa] |
| EX. 1 | 31 | Bu[1] | 11 | 0.32 | 60 | 0.68 |
| EX. 2 | 29 | Bu | 11 | 0.28 | 60 | 0.70 |
| EX. 3 | 29 | Bu | 11 | 0.28 | 60 | 0.69 |
| EX. 4 | 25 | Bu | 11 | 0.26 | 60 | 0.70 |
| EX. 5 | 30 | Bu | 11 | 0.30 | 60 | 0.67 |
| EX. 6 | 30 | Bu | 11 | 0.30 | 60 | 0.68 |
| EX. 7 | 23 | Bu | 20 | 0.28 | 30 | 0.29 |
| EX. 8 | 20 | Water | 3.6 | 0.32 | 180 | 4.0 |
| EX. 9 | 31 | Bu | 11 | 0.30 | 60 | 0.65 |
| EX. 10 | 38 | Bu | 11 | 0.34 | 60 | 0.67 |
| EX. 11 | 33 | Bu | 11 | 0.34 | 60 | 0.70 |
| COMP. EX. 1 | 29 | Bu | 11 | 0.28 | 60 | 0.56 |
| COMP. EX. 2 | 24 | Bu | 20 | 0.26 | 30 | 0.24 |
| COMP. EX. 3 | 22 | Water | 20 | 0.26 | 30 | 0.25 |
| COMP. EX. 4 | 18 | Water | 3.6 | 0.32 | 180 | 3.2 |
| COMP. EX. 5 | 39 | Bu | 11 | 0.42 | 60 | 0.70 |
| COMP. EX. 6 | 46 | Bu | 11 | 0.46 | 60 | 0.75 |

[1]Bu: Butane

The tables show that the polypropylene resin pre-expanded particles containing the resin of EXAMPLES can produce an in-mold foamed article having a compression strength higher than that of the in-mold foamed article formed from the conventional polypropylene resin pre-expanded particles of COMPARATIVE EXAMPLES 1 to 4 by about 20 to 30 percent.

In order to achieve a compression strength observed in EXAMPLES, the minimum foaming heating steam pressure must be over 0.4 MPa if the technology of the present invention is not used, as shown by COMPARATIVE EXAMPLES 5 and 6. Thus, a common molding machine that withstands a pressure of up to 0.4 MPa cannot be used.

As mentioned above, according to the techniques of the present invention, a high-rigidity molded article with a good surface appearance can be produced from polypropylene resin pre-expanded particles using a common molding machine that can withstand a pressure of up to 0.4 MPa.

The invention claimed is:

1. A polypropylene resin pre-expanded particle comprising a base resin that has a MFR of 5 g/10 min or more and 20 g/10 min or less and a melting point of 140° C. or higher and 155° C. or lower,
   wherein the base resin is a mixture containing:
      70 percent or more and 95 percent or less by weight of a polypropylene resin (A) having a MFR of 10 g/10 min or more and 30 g/10 min or less and a molecular weight distribution Mw/Mn of 6 or less, and containing 1-butene as a comonomer; and
      5 percent or more and 30 percent or less by weight of a polypropylene resin (B) having a MFR of 0.1 g/10 min or more and 3 g/10 min or less, and
   the base resin exhibits a relationship between a heat of crystal fusion and the resin melting point determined with a differential scanning calorimeter satisfying conditional formula (1):

$$[\text{Heat of crystal fusion (J/g)}] \geq 1.2 \times [\text{Melting point (°C.)}] - 96 \qquad (1).$$

2. The polypropylene resin pre-expanded particle according to claim 1, wherein a ratio $\{Qh/(Ql+Qh)\} \times 100$ of the heat at the high-temperature-side fusion peak calculated from heat of a low-temperature-side fusion peak Ql and heat of a high-temperature-side fusion peak Qh is 15% or more and 50% or less, the two fusion peaks being observed by differential scanning calorimetry.

3. An in-mold foamed article produced from the polypropylene resin pre-expanded particle according to claim 1, wherein the article has a density of 10 kg/m³ or more and 300 kg/m³ or less.

4. The polypropylene resin pre-expanded particle according to claim 1, wherein the MFR of the polypropylene resin, the polypropylene resin (A) and polypropylene resin (B) are measured with a MFR meter described in JIS-K7210, with an orifice diameter of 2.0959±0.005 mm, an orifice length of 8.000±0.025 mm, a load of 2,160 g, and a temperature of 230° C.±0.2° C.

5. The polypropylene resin pre-expanded particle according to claim 1, wherein the polypropylene resin (B) has a MFR of 0.2 g/10 min or more and 2 g/10 min or less.

* * * * *